April 28, 1936.                H. H. BIXLER                2,039,053
                          REFRIGERATING MACHINE
                        Original Filed Jan. 11, 1935

Inventor:
Harley H. Bixler,
by Harry E. Dunham
His Attorney.

Patented Apr. 28, 1936

2,039,053

UNITED STATES PATENT OFFICE 2,039,053

REFRIGERATING MACHINE

Harley H. Bixler, Schenectady, N. Y., assignor to General Electric Company, a corporation of New York Original application January 11, 1935, Serial No. 1,337. Divided and this application June 15, 1935, Serial No. 26,797

6 Claims. (Cl. 62—115)

My invention relates to compression type refrigerating machines and, more particularly, to an improved arrangement for mounting the intake and discharge conduits of the compressor therefor.

My present application is a division of my application Serial No. 1,337, filed January 11, 1935, and assigned to the General Electric Company, assignee of my present application.

It is an object of my invention to provide an improved mounting for the discharge conduit of a refrigerant compressor in order to minimize the vibration and noise produced thereby.

Another object of my invention is to provide an improved arrangement of a muffle box, intake and discharge conduits of a refrigerant compressor which requires a minimum number of parts, is compact and rugged in construction and which is economical to manufacture.

Further objects and advantages of my invention will become apparent as the following description proceeds and the features of novelty which characterize my invention will be pointed out with particularity in the claims annexed to and forming a part of this specification.

Figure 1:
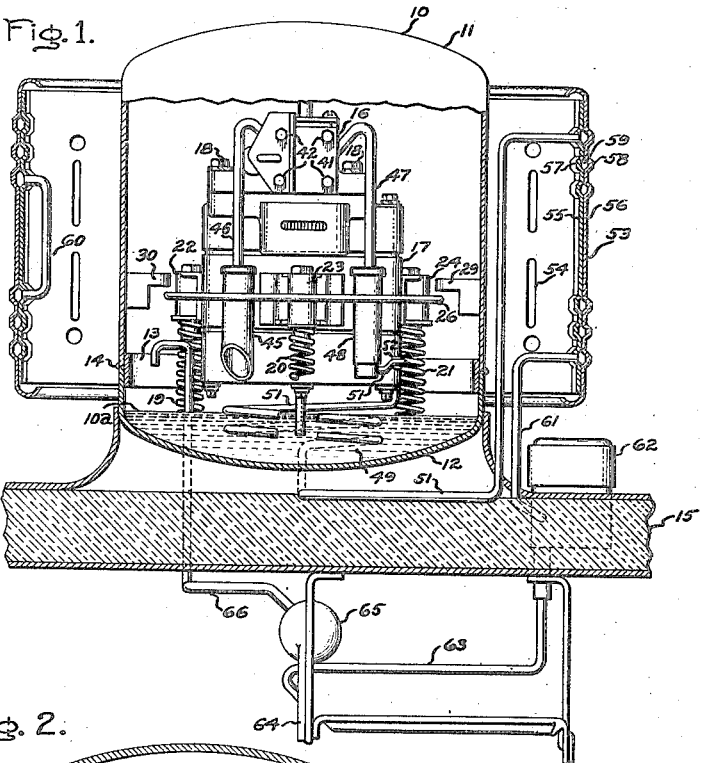
Figure 2:
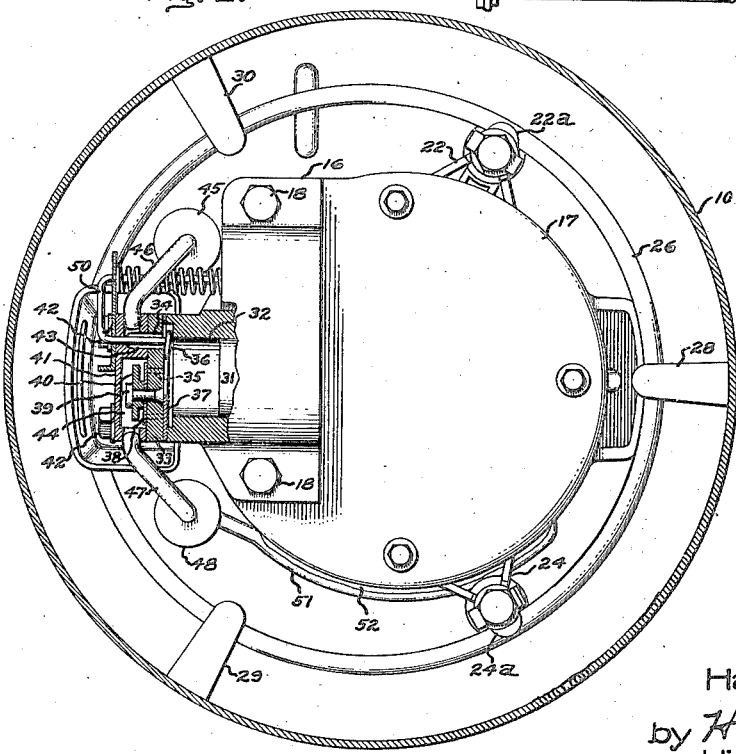

For a better understanding of my invention, reference may be had to the accompanying drawing, in which Fig. 1 is a side elevation, partly in section, of a refrigerating machine embodying my invention, and Fig. 2 is a plan view, partly in section, of the casing and motor driven compressor of the refrigerating machine shown in Fig. 1, the top of the compressor being broken away.

Referring to the drawing, in Fig. 1, I have shown a refrigerating machine of the household type provided with a hermetically sealed casing 10 made of an upper casing section 11 and a lower casing section 12, the adjacent edges of these sections being welded together over a reinforcing ring 13, as indicated at 14. The casing sections 11 and 12 are preferably made of steel and are mounted on a removable cabinet top 15. A refrigerant compressor 16 and an electric driving motor 17 therefor are contained within the hermetically sealed casing 10. The compressor 16 is secured to the top of the driving motor 17 by bolts 18 thus forming a compact unitary structure. This unitary structure is mounted in the casing 10 on three vertical helical springs 19, 20, and 21. The upper ends of the springs 19, 20, and 21 are secured to feet 22, 23, and 24, respectively, these feet being welded to the periphery of the frame of the motor 17 at equally spaced intervals of approximately 120°. A bumper ring 26 surrounds the unitary structure and is secured in slots 22a, 23a, and 24a, formed in the feet 22, 23, and 24. A series of stops 28, 29, and 30 are welded to the inner side wall of the casing 10 at spaced intervals of approximately 120°. These stops limit the vertical movement of the unitary structure by engagement with the bumper ring 26.

The mounting arrangement for the unitary compressor and motor structure, described above, forms no part of my present invention, but is disclosed and claimed in my application Serial No. 1,338, filed January 11, 1935, and assigned to the General Electric Company, the assignee of my present invention.

The electric driving motor 17 is provided with a vertical shaft which reciprocates a compressor piston 31 in a horizontal cylinder 32 through a suitable Scotch yoke mechanism or the like. The outer end of the cylinder 32 is closed by a valve assembly including a flat rectangular valve plate 33 having an inlet passage 34 and a discharge passage 35 formed therein which communicate with the interior of the cylinder 32. The inlet passage 34 is controlled by an inlet valve element 36 formed by an integral tongue in a sheet metal inlet valve supporting member 37 which extends across the inner face of the valve plate 33. The discharge passages 35 are closed by a disk-shaped discharge valve element 38 which is secured to the exterior surface of the valve plate 33 by a rivet 39 and valve retainer 40.

The valve assembly, described above, forms no part of my present invention but is described and claimed in my application Serial No. 26,067, filed June 11, 1935, and assigned to the General Electric Company, the assignee of my present invention.

A muffle box is secured to the compressor, the muffle box being provided with depending intake and discharge conduits having intake and discharge mufflers secured to their lower ends. The muffle box, intake and discharge conduits, and muffler thus form a unitary structure which may be separately assembled during the manufacture of the refrigerating machine and which may be readily assembled or disassembled from the compressor as a compact unit. In the illustrative form of my invention, a rectangular muffle box 41 is secured to the exterior side of the valve plate 33 by a series of screws 42 which pass through registering holes formed adjacent the corners of the muffle box 41, valve plate 33 and valve supporting member 37, their inner ends being threaded in tapped holes formed in the cylinder 32. The muffle box 41 is provided with an intake recess 43 formed therein which forms a continuation of the outer end of the inlet passage 34. A discharge recess 44 is also formed in the muffle box 41 and surrounds the discharge valve 38 and the outer ends of the discharge passages 35. A suitable cylindrical intake muffler 45 is secured to the lower end of a depending intake conduit 46 which communicates with the intake recess 43. The upper end of the intake conduit 46 is soldered, or otherwise rigidly secured, to the muffle box 41. A similar depending discharge conduit 47 communicates with a discharge recess 44, the upper end thereof being soldered, or otherwise rigidly secured, to the muffle box 41. A suitable cylindrical discharge muffler 48 is secured to the lower end of the discharge conduit 47.

In the operation of the refrigerating machine illustrated, when the motor 17 is started by a suitable temperature control device, lubricant 49 from a reservoir formed in the lower casing 12 is supplied under pressure to an unloader mechanism which moves the U-shaped unloader actuating rod 50 outwardly when the motor 17 reaches a predetermined speed. The unloader mechanism forms no part of my present invention, but is described and claimed in my application Serial No. 1,337, referred to above. The inlet valve element 36 is thus free to operate normally. As the piston 31 in the cylinder 32 is retracted on its suction stroke, the pressure within the cylinder 32 is reduced and the pressure of the gaseous refrigerant in the inlet passage 34 causes the inlet valve element 36 to be flexed backwardly, thus admitting gaseous refrigerant, such as sulphur dioxide, to the interior of the cylinder 32. The gaseous refrigerant is supplied to the intake recess 43 and inlet passage 34 through the intake muffler 45 and intake conduit 46 from the interior of the casing 10 above the level 10a of lubricant therein. When the piston 31 is moved in the opposite direction on its compression stroke, the gaseous refrigerant within the cylinder 32 is compressed and the increased pressure within the cylinder 32 causes the inlet valve element 36 to flex back to its closed position. The increased pressure of the compressed refrigerant within the cylinder 32 also causes the discharge valve element 38 to be flexed backwardly against the valve retainer 40, thus opening the discharge passages 35 and allowing the compressed gaseous refrigerant to escape into the discharge recess 44 of the muffle box 41. The compressed gaseous refrigerant thus passes from the discharge recess 44 through the discharge conduit 47 to the discharge muffler 48 and from there through a series discharge conduit 51.

The conduit 51, which is relatively flexible, being made of copper tubing or the like, is secured to a relatively heavy rigid support in order to prevent vibration thereof. In the illustrative form of my invention, the conduit 51 is soldered, or otherwise rigidly secured, as indicated at 52, to the periphery of the motor 17, thus providing a rigid mounting for the conduit 51 which aids in suppressing noise due to the movement of the compressed gaseous refrigerant therein. A substantial portion of the conduit 51 is secured in this manner to the periphery of the motor 17; this is, it extends about approximately one-sixth of the circumference of the motor.

An intermediate portion of the conduit 51 is helical in form, thus providing a resilient connection between the unitary compressor-motor structure, which is free to vibrate on the springs 19, 20, and 21, and the rigidly mounted casing 10. The increased length of the conduit 51 so provided also aids in dissipating the vibratory energy of the compressed gaseous refrigerant contained therein and, hence, in the suppression of noise caused thereby.

The compressed gaseous refrigerant passes through the conduit 51 to a condenser 53 which is cooled by natural draft and which surrounds the casing 10 being mounted on an annulus of heat conducting fins 54. The condenser 53 is formed by a pair of complementary inner and outer sheets of steel or the like 55 and 56, respectively, which are provided with complementary indentations 57 and 58 therein which form a refrigerant circulatory passage 59 extending about the condenser 53. The sheets 55 and 56 are welded, or otherwise rigidly secured, together about the edges thereof and between the indentations 57 and 58 throughout their length. The passage 59 is preferably divided into upper and lower sections which are connected in series by a conduit 60. The compressed gaseous refrigerant is liquefied in the condenser 53 and flows therefrom through a conduit 61 to a flow controlling float valve 62. Liquid refrigerant is supplied from the float valve 62 through a liquid line 63 to a sheet metal flooded type evaporator 64. The evaporator 64 is supported in a cooling compartment by the heat insulated removable cabinet top 15. The liquid refrigerant contained in the evaporator 64 is vaporized by the absorption of heat from articles contained in the cooling compartment in which the evaporator is located and the vaporized refrigerant is collected in a cylindrical header 65 which is normally maintained about half full of liquid refrigerant. The vaporized refrigerant, which is accumulated above the level of the liquid refrigerant in the header 65, is returned to the interior of the casing 10 through a suction conduit 66 which communicates with the header 65 above the normal liquid level therein. It will be noted that the discharge end of the conduit 66 is located above the normal level of the lubricant 49 in the reservoir formed in the lower section 12 of the casing 10. The vaporized refrigerant thus discharged in the casing 10 is again drawn into the intake muffler 45 and the cycle, above described, is repeated until the compartment in which the evaporator 64 is located is cooled to the desired temperature. It will be noted that the casing 10 is normally filled with low pressure gaseous refrigerant above the level of the lubricant 49. Any refrigerant which may have been entrapped in the lubricant 49 will be released from this relatively quiet body of lubricant and will again be mingled with the low pressure gaseous refrigerant thereabove.

While I have shown a particular embodiment of my invention in connection with a household type refrigerating machine, I do not desire my invention to be limited to the particular construction shown and described and I intend in the appended claims to cover all modifications within the spirit and scope of my invention.

What I claim as new and desire to secure by Letters Patent of the United States is:

1. A refrigerating machine comprising a refrigerant compressor, means for resiliently supporting said compressor, a refrigerant condenser, means including a relatively flexible discharge conduit for conveying compressed refrigerant from said compressor to said condenser, and means including a relatively heavy rigid support for preventing vibration of said conduit, said conduit being secured to said support throughout a substantial portion of its length.

2. A refrigerating machine comprising a refrigerant compressor, means for resiliently supporting said compressor, a refrigerant condenser, means including a relatively flexible discharge conduit for conveying compressed refrigerant from said compressor to said condenser, and means including a relatively heavy rigid support to which a substantial portion of said conduit is secured in a continuous line for preventing vibration of said conduit.

3. A refrigerating machine comprising a refrigerant compressor and a driving motor therefor mounted as a unitary structure, means for resiliently supporting said unitary structure, a refrigerant condenser, means including a relatively flexible discharge conduit for conveying compressed refrigerant from said compressor to said condenser, and means including a rigid connection between a substantial portion of said conduit and said unitary structure for preventing vibration of said conduit.

4. A refrigerating machine comprising a refrigerant compressor, means for resiliently supporting said compressor, a refrigerant condenser, a muffle box mounted on said compressor, a discharge conduit extending from said muffle box and communicating with a discharge muffler, means including a relatively flexible conduit for conveying compressed refrigerant from said discharge muffler to said condenser, and means including a relatively heavy rigid support to which a substantial portion of said conduit is secured in a continuous line for preventing vibration of said conduit.

5. A refrigerating machine comprising a refrigerant compressor, a driving motor therefor provided with a vertical driving shaft, said compressor being mounted on the top of said motor, means for resiliently supporting said motor and compressor, a muffle box mounted on said compressor and having a discharge recess formed therein, a depending discharge conduit extending downwardly from said muffle box and communicating with said discharge recess, a discharge muffler secured to the lower end of said discharge conduit, a refrigerant condenser, means including a relatively flexible conduit for conveying compressed refrigerant from said discharge muffler to said condenser, and means including a rigid connection between a substantial portion of said last mentioned conduit and said motor for preventing vibration of said last mentioned conduit.

6. A refrigerating machine comprising a refrigerant compressor provided with inlet and discharge ports, a muffle box mounted on said compressor, said muffle box being provided with intake and discharge recesses formed therein communicating with said inlet and discharge ports respectively, a depending intake conduit secured to said muffle box and communicating with said intake recess, an intake muffler secured to the lower portion of said intake conduit, a depending discharge conduit secured to said muffle box and communicating with said discharge recess, and a discharge muffler secured to the lower end of said discharge conduit.

HARLEY H. BIXLER.